United States Patent [19]
Rossi et al.

[11] Patent Number: 5,872,881
[45] Date of Patent: Feb. 16, 1999

[54] HIGH-THERMAL-CONDUCTIVITY SEALED PACKAGE FOR FIBER OPTIC COUPLING TO AN OPTOELECTRONIC DEVICE

[75] Inventors: David M. Rossi, San Francisco; Harrison L. Ransom, Antioch, both of Calif.

[73] Assignee: SDL, Inc., San Jose, Calif.

[21] Appl. No.: 799,786

[22] Filed: Feb. 12, 1997

[51] Int. Cl.$^6$ .................................................. G02B 6/36
[52] U.S. Cl. ............................................................ 385/92
[58] Field of Search .......................................... 385/88–94

[56] References Cited

U.S. PATENT DOCUMENTS

| | | | |
|---|---|---|---|
| 4,119,363 | 10/1978 | Camlibel et al. | 350/96.2 |
| 4,752,109 | 6/1988 | Gordon et al. | 350/96.2 |
| 4,977,243 | 3/1991 | Aiki et al. | 350/96.2 |
| 5,029,968 | 7/1991 | Geiser, Jr. et al. | 350/96.2 |
| 5,430,820 | 7/1995 | van Tongeren et al. | 385/94 |
| 5,717,804 | 2/1998 | Pan et al. | 385/94 |

*Primary Examiner*—Hung N. Ngo
*Attorney, Agent, or Firm*—W. Douglas Carothers, Jr.

[57] ABSTRACT

A hermetically sealed package for an optoelectronic device such as a diode laser comprises a side wall welded to a thermally conductive heat sink mount, and a lid welded to the side wall. Testing and alignment of the device are performed before the attachment of the side wall to the mount. Feedthroughs for optical fibers and electrical connections run through the side wall. The feedthrough seals are established within projections extending away from the side wall, to protect the seals from melting during welding steps. A high-resistivity piece is present at the interface between the side walls and the base, to provide heating localized to the interface, and thereby reduce the heating of the laser during welding. The mount is pressed into a receiving structure, which is attached to an external heat sink. The bottom surface of the mount protrudes from the receiving structure, and is in direct contact with the external heat sink. In an alternative embodiment, the optoelectronic device and optical fiber are encapsulated in epoxy after optical and electrical testing and alignment.

62 Claims, 6 Drawing Sheets

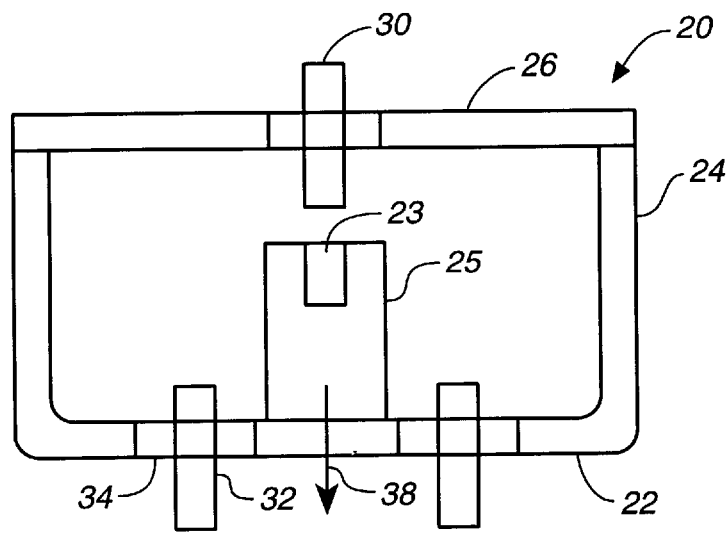
FIG._1A
*(PRIOR ART)*
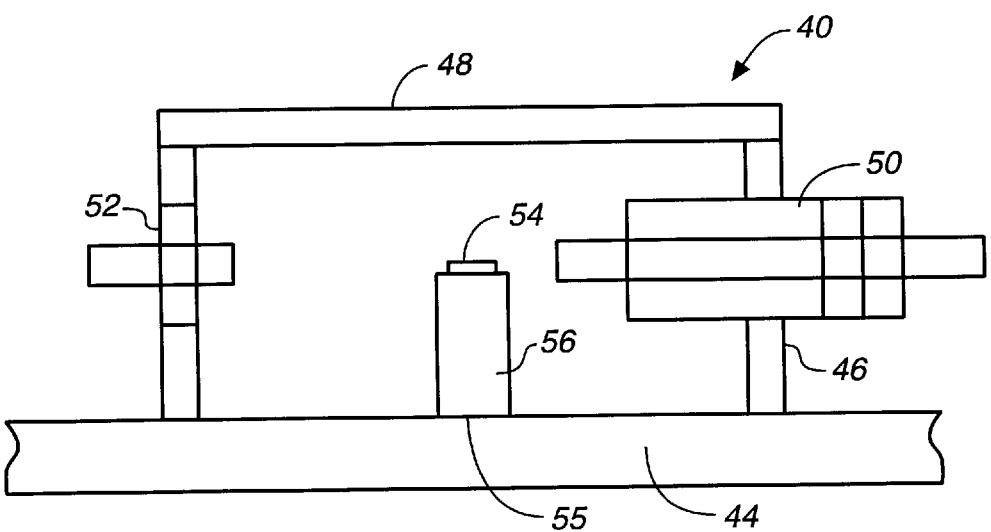
FIG._1B
*(PRIOR ART)*

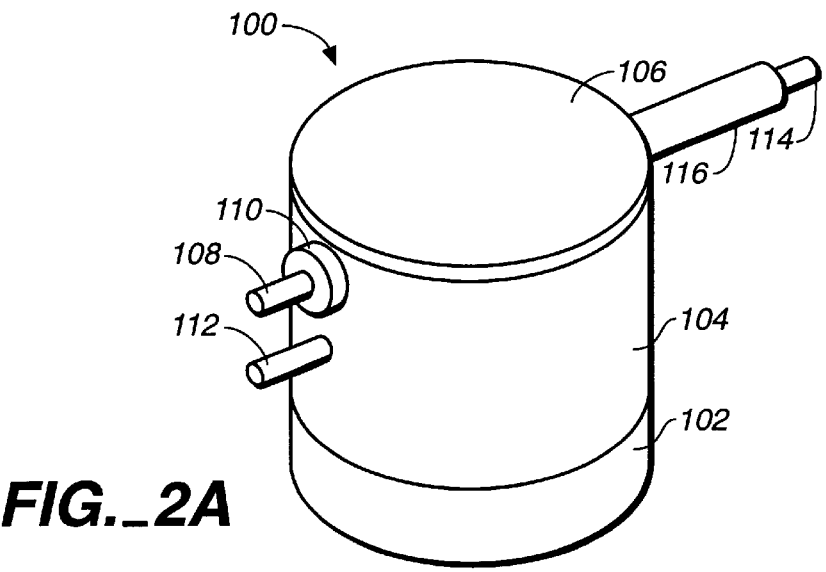
FIG._2A
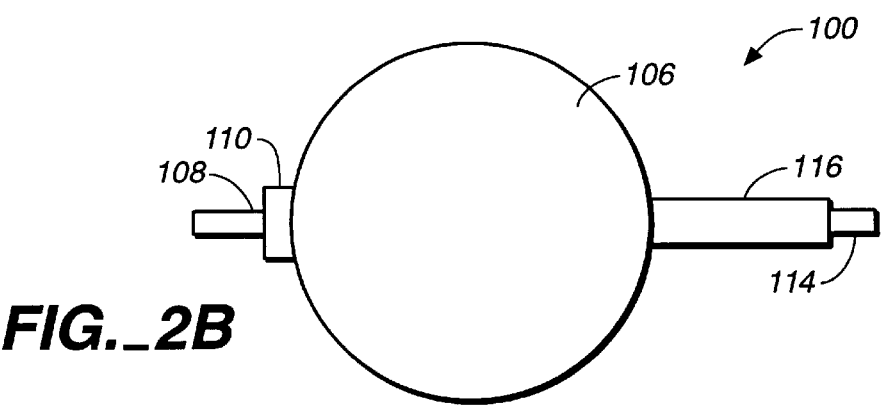
FIG._2B
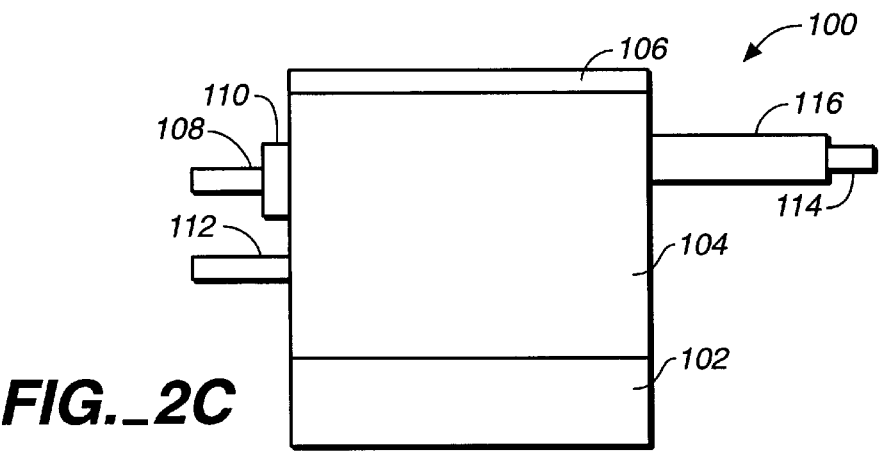
FIG._2C

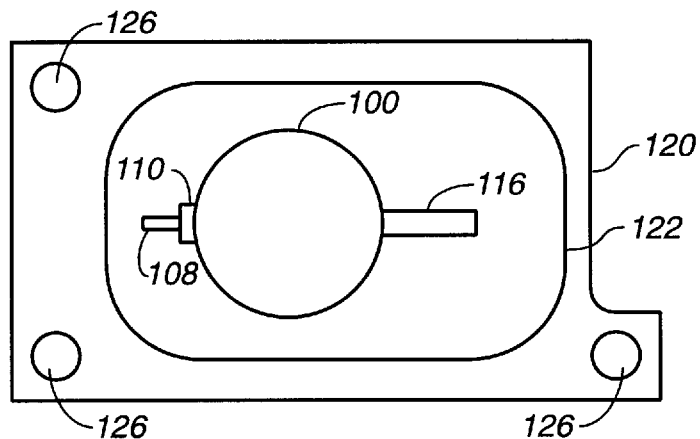
FIG._3A
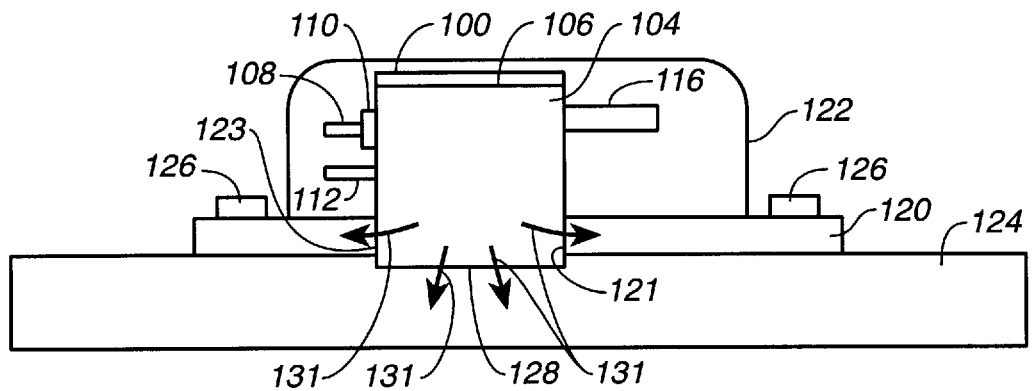
FIG._3B

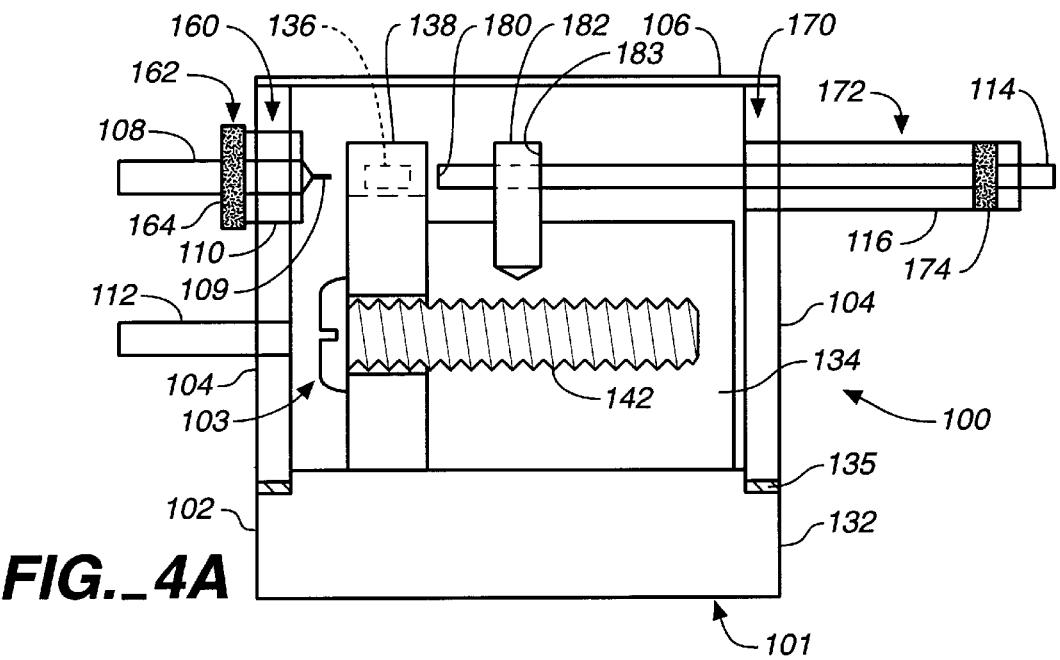
FIG._4A
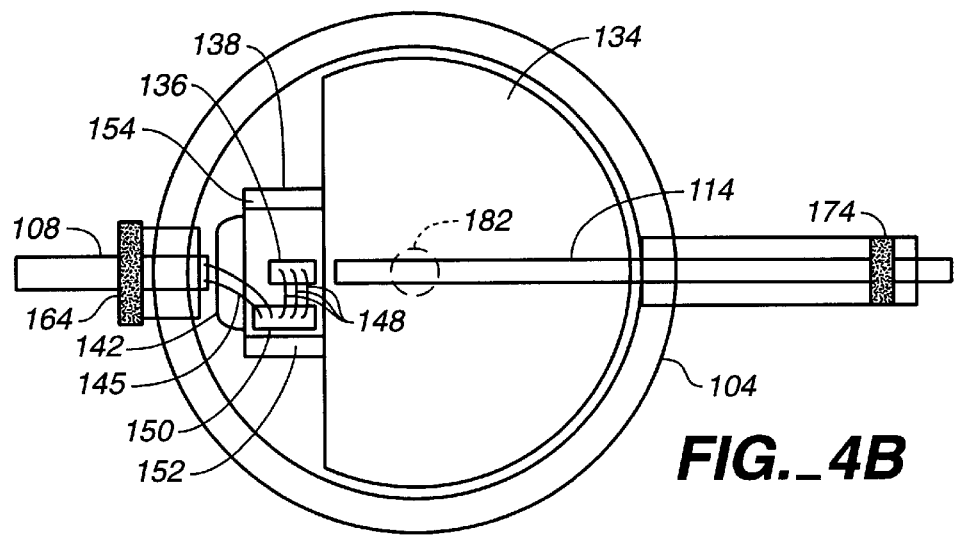
FIG._4B
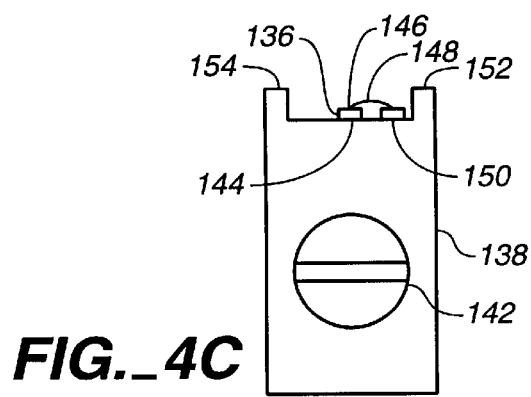
FIG._4C

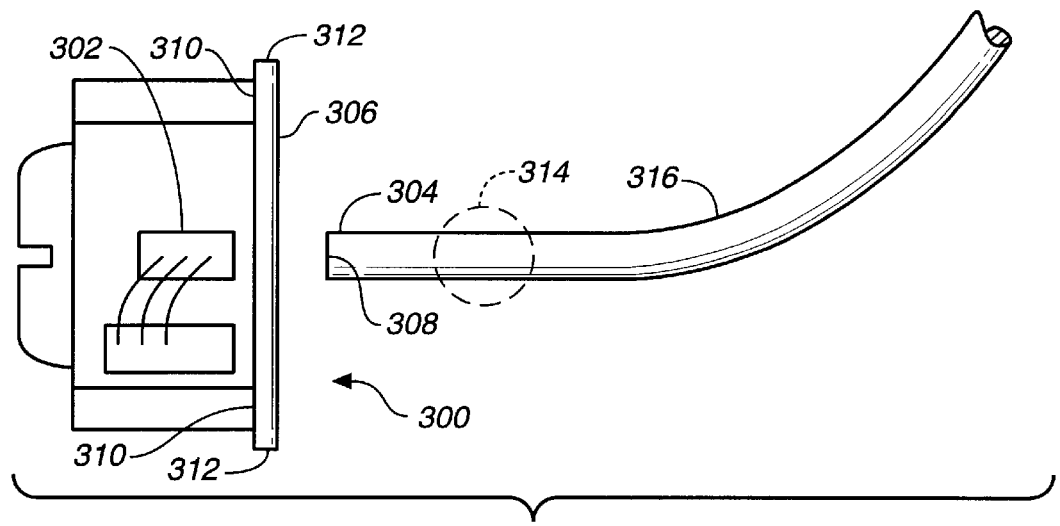
FIG._5A
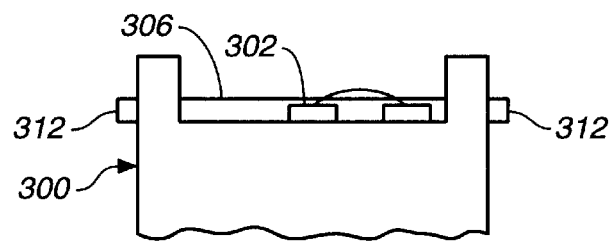
FIG._5B
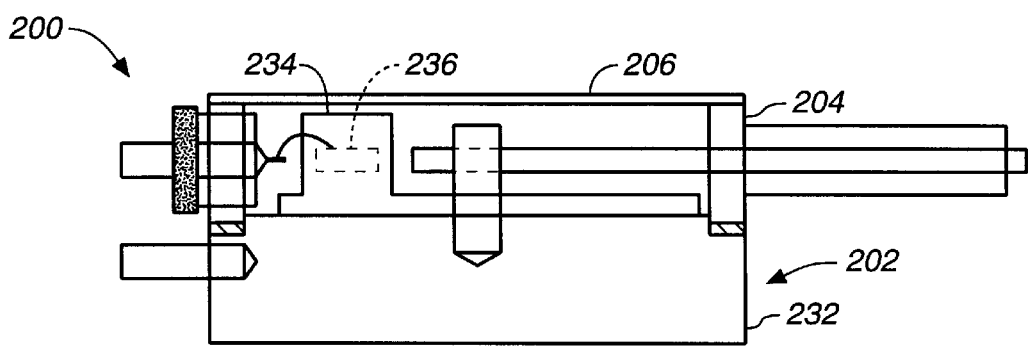
FIG._6

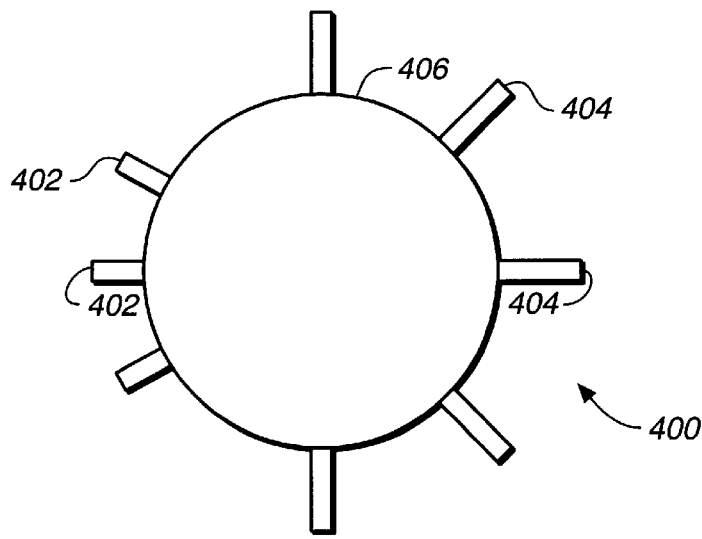
FIG._7
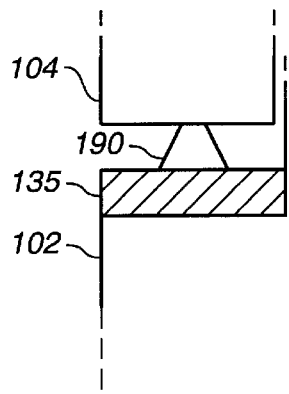
FIG._8A
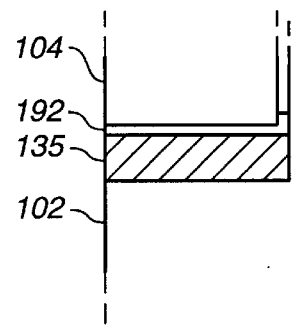
FIG._8B
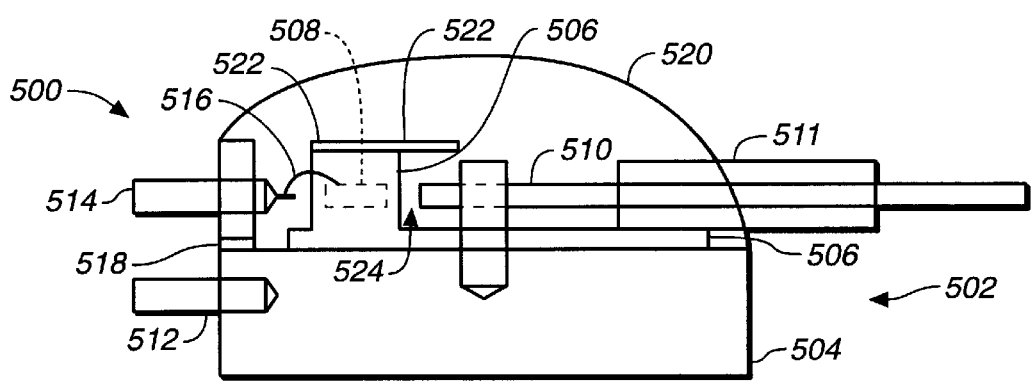
FIG._9

HIGH-THERMAL-CONDUCTIVITY SEALED PACKAGE FOR FIBER OPTIC COUPLING TO AN OPTOELECTRONIC DEVICE

FIELD OF THE INVENTION

This invention relates to a package for an optoelectronic device. More particularly, it relates to a compact, hermetically sealed, high-thermal-conductivity package for a diode laser.

BACKGROUND OF THE INVENTION

Packages for coupling optoelectronic components to optical fibers are subject to numerous design constraints. It is in general desirable that such packages be hermetically sealed, compact, and easily manufacturable. It is also desirable that such packages provide efficient cooling of the optoelectronic components, and allow access to optical elements within the package during the alignment of various optical elements. It is important that high-temperature manufacturing steps not damage heat-sensitive package components. In addition, it is desirable that the package manufacturing process include as few thermal processing steps as possible. Thermal processing steps, such as soldering, typically require heating the entire package and significantly increase manufacturing costs.

In a commonly used design approach for a diode laser package, a diode laser is mounted within a hermetically sealed housing having a base, side walls, and a lid. Heat dissipated by the laser is transferred to an external heat sink through the base. The housing has a feedthrough for an optical fiber, and electrical feedthroughs for electrical connections to the laser. Typically, the electrical feedthroughs run through the base, while the optical feedthrough runs through the lid.

For examples of packages for optoelectronic devices see U.S. Pat. Nos. 4,119,363, 4,752,109, 5,029,968, and 5,430,820, which are herein incorporated by reference. The packages disclosed in the above-incorporated patents have relatively poor thermal conductivities, or cannot be easily assembled. In addition, the soldering processes used in assembling the packages place significant restrictions on the package manufacturing, since soldering typically requires heating the entire package to a temperature that can damage optoelectronic components.

OBJECTS AND ADVANTAGES OF THE INVENTION

In light of the above, it is a primary object of the present invention to provide an improved package for a semiconductor device, preferably an optoelectronic device. The package has improved thermal conductivity characteristics. The same mount can be used with receiving structures of various geometries to produce packages that can be mounted on various external heat sinks. It is another object to allow relatively unobstructed access to package components, for testing and alignment, after the components are mounted on the mount but before the components are surrounded by a side wall or an encapsulation. It is another object to provide a package that can be assembled without undesirable thermal processing steps for attaching side walls to a mount, or the mount to an external heat sink. The package is compact, and is hermetically sealed using only metal-to-metal, glass-to-metal or ceramic-to-metal seals. In a preferred embodiment, the package assembly does not make use of organic materials potentially deleterious to optoelectronic devices. The package allows welding of its component parts, and provides for localized heating of the welding material such that optoelectronic components are not damaged during welding steps. Feedthroughs for optical fibers and electrical connections are adapted to allow projection welding of the side wall to the mount. The package is adapted to be press-fitted into a receiving structure. The mount is brought in contact with a heat sink directly, i.e. not through the receiving structure. The package is adapted to maintain the alignment of a fiber to the optoelectronic device as temperatures within the package vary. The package allows reducing stress resulting from the differential expansion of the fiber and the package walls.

SUMMARY OF THE INVENTION

The present invention provides a hermetically sealed package comprising a thermally conductive heat sink mount having a base portion and a mounting portion, a heat-dissipating semiconductor device mounted on the mounting portion, a side wall welded to the mount and enclosing the device, an electrical connector in electrical communication with the device, and a lid mounted on the side wall, opposite the mount. The electrical connected passes through a connector feedthrough in the side wall. A hermetically sealed enclosure is defined between the mount, side wall, and lid.

The semiconductor device preferably comprises a light source such as a diode laser. An optical fiber is in optical communication with the light source, and passes through a fiber feedthrough in the side wall. A first seal between the fiber and the fiber feedthrough is made within a first shunting projection of the fiber feedthrough. The first shunting projection extends away from the side wall, and protects the first seal from heat generated by current passing through the side wall during a step of welding the lid to the side wall. The first seal is preferably a solder seal, while the first shunting projection is made of a metal.

A fiber holder mounted on the mounting portion holds the fiber input in a fixed position relative to the light source. The fiber holder is pressed into a holder receiving aperture in the mounting portion. The fiber holder is substantially expansion-matched to the mount. That is, the thermal expansion coefficient of the fiber holder is chosen such that the fiber and the light source remain substantially aligned upon temperature variations resulting from the normal operation of the light source. The fiber has a bend for reducing the stress in the fiber resulting from the differential expansion of the fiber relative to the side wall. A lens placed between the light source output and the fiber input couples light emitted by the light source into the fiber input.

One electrical lead of the light source is in electrical communication with the base portion, which in turn is in electrical communication with the side wall. Another lead of the light source is in electrical communication with the connector. An electrically insulating second seal between the connector and the connector feedthrough is made within a second shunting projection of the connector feedthrough. The second shunting projection extends away from the side wall, and protects the second seal from heat generated by current passing through the side wall during a step of welding the side wall and the base. The second seal is preferably a glass seal, while the second shunting projection is made of a metal.

A cross-section of the side wall has a generally round shape. In particular, the side wall has a substantially cylindrical shape. The side wall and the mount are adapted to be projection welded. In particular, the package has a high-resistivity piece at the interface between the mount and the side wall, for allowing localized heating of welding material at the interface without heating the rest of the package or the light source. The lid and the side wall are also adapted to be projection welded.

The base portion comprises a lower step adapted to be mounted on the receiving structure, while the mounting portion comprises an upper step enclosed by the side wall. The lower and upper steps are part of the same metal piece, so that there is no interface impeding the heat flow from the upper step to the lower step. The lower step is cylindrical, while the upper step preferably comprises a cylinder cleaved along a plane parallel to the cylinder axis. The mounting portion comprises a block mounted on the upper step along the plane parallel to the cylinder axis. The light source is mounted on the block. In one embodiment, the mount consists of a monolithic piece comprising the base and mounting portions.

The package further comprises a receiving structure having a receiving aperture. The base portion fits into the receiving aperture. The base portion is adapted to be pressed into the receiving structure. The fit between the base portion and the receiving structure is then a press fit. The cross-sections of the base portion and the receiving aperture are generally round at the interface between the base portion and the receiving structure, such that the base portion can be press-fitted into the receiving structure. Preferably, the base portion and the receiving aperture have substantially cylindrical shapes. The tolerances of the base portion and receiving aperture are controlled tightly enough to allow pressing the base portion into the receiving structure.

In one embodiment, the fit between the base portion and the receiving structure is a close sliding fit. A thermally conductive adhesive such as thermal epoxy is present at the interface between the base portion and the receiving structure. In yet another embodiment, the base portion is connected to the receiving structure by a threaded engagement.

The mount and receiving structure are preferably made of high-thermal-conductivity materials such as copper. The base portion is preferably in thermal communication with the receiving structure through an aperture wall of the receiving structure. In one embodiment, the aperture wall provides for a primary heat transfer from the base portion.

The receiving structure is mounted on an external heat sink. The bottom surface of the base portion is in contact with the external heat sink. For a flat external heat sink, the bottom surface preferably protrudes slightly from the receiving structure. Preferably, the bottom surface provides for a primary heat transfer from the base portion.

In an embodiment not requiring the use of a side wall, the package comprises an encapsulation for encapsulating the diode laser and at least part of the optical fiber. The encapsulation preferably comprises a thermally conductive epoxy. The package preferably comprises a protecting means for preventing the encapsulation from extending into an optical coupling region. The optical coupling region is the region between the laser output and the fiber input. If the encapsulation fills the coupling region, the encapsulation preferably comprises a material that is transparent at an emission wavelength of the laser.

The present invention further provides a method of fabricating a thermally conductive package for a heat-dissipating semiconductor device. The device is mounted on a heat sink mount having a mounting portion and a base portion. The device is mounted on the mounting portion and is tested. A side wall having a sealed connector feedthrough is welded to the mount such that the side wall encloses the device. A seal between an electrical connector passing through the connector feedthrough and a second shunting projection of the connector feedthrough is established before the welding of the side wall to the mount. The electrical connector is brought in electrical communication with the device. A lid is mounted on the side wall opposite the mount, such that a hermetically sealed enclosure is defined substantially by the mount, side wall, and lid.

For a device comprising a light source, an optical communication is established between an optical fiber and the light source before the side wall is welded to the mount. The fiber passes through a fiber feedthrough in the side wall. A seal between the fiber and a second shunting projection of the fiber feedthrough is established after the side wall is welded to the mount.

The method further comprises fitting the base portion of the mount into a matching receiving aperture of a receiving structure. The base portion is preferably pressed into the receiving structure.

DESCRIPTION OF THE FIGURES

FIG. 1A shows a prior art diode laser package.

FIG. 1B shows another prior art diode laser package.

FIG. 2A is a perspective view of a diode laser package of the present invention.

FIG. 2B is a side view of the package of FIG. 2A.

FIG. 2C is a top view of the package of FIG. 2A.

FIG. 3A is a top view of a package mounted on an auxiliary plate, according to the present invention.

FIG. 3B is a side view of the package of FIG. 3A, showing the auxiliary plate mounted on a heat sink, according to the present invention.

FIG. 4A is a detailed side view of the package of FIG. 2A.

FIG. 4B shows the package of FIG. 4A in a top view.

FIG. 4C is a front view of a block for mounting a light source, according to the present invention.

FIG. 5A is a top view of a detail of an alternative embodiment of the present invention.

FIG. 5B is front view of the detail of FIG. 5A.

FIG. 6 is a side view of an alternative embodiment of the present invention.

FIG. 7 is a top view of an alternative embodiment of the present invention.

FIG. 8A shows a base-wall interface prior to welding, in a package of the present invention.

FIG. 8B shows the base-wall interface in FIG. 5A after the welding of the base to the wall.

FIG. 9 shows a package comprising an encapsulation, according to the present invention.

DETAILED DESCRIPTION

FIG. 1A shows schematically a typical prior art package 20 for a diode laser 23. Package 20 has a base 22, side walls 24, and a lid 26. Laser 23 is mounted on a mount 25, which is in thermal communication with base 22. Base 22 is placed on a heat sink (not shown). Heat flows away from the package through base 22, as illustrated by the arrow 38. Electrical connectors 32 run though feedthroughs 34 in base 22, while an optical fiber 30 runs through a feedthrough in lid 26. Feedthroughs 34 have glass seals. It is important that the seals of feedthrough 34 not be placed under deleterious stresses resulting from temperature variations in base 22 during the operation of the laser. Consequently, base 22 is typically made of Kovar™ (General Electric), an alloy thermal-expansion-matched to glass. Kovar™ is a relatively poor thermal conductor. In addition, the interface between base 22 and the heat sink significantly hinders the heat flow from base 22. Consequently, laser 23 is not cooled very efficiently.

Package 20 is mounted directly on an external heat sink. Since a typical heat sink requires in general a unique mounting geometry, a package of a different base geometry (size of base, connector feedthrough arrangements) is manufactured for each type of heat sink used.

FIG. 1B shows schematically a package 40 described in the above-incorporated U.S. Pat. No. 4,119,363. Package 40 comprises a base 44, side walls 46 and a lid 48. Radial feedthroughs 50, 52 for an optical fiber and an electrical connector run through side walls 46. A laser 54 is mounted on a mount 56, which is in thermal communication at 55 with base 44. Side walls 46 are soldered to base 44 before the mounting of laser 54 within the package, so that laser 54 is not damaged during the soldering process. The presence of side walls 46 during the mounting and alignment of laser 54, and the radial orientation of feedthroughs 50, 52 require a large space within package 40 so as to allow access to laser 54 during testing and alignment procedures. Moreover, making the above-described package requires the undesirable thermal processing step of soldering side walls 46 to base 44, which raises the production cost of package 40.

FIG. 2A is a perspective view of the outside of a package 100 of the present invention. FIGS. 2B and 2C are top and side views of package 100, respectively. Package 100 comprises a thermally conductive heat sink mount having a base portion 102 and a mounting portion 103. Package 100 further comprises a side wall 104 and a lid 106. Base portion 102 is made of a high-thermal-conductivity material, while side wall 104 and lid 106 are made of weldable, non-corrodable materials. The materials used for base portion 102, side wall 104 and lid 106 have similar (preferably, substantially equal) thermal expansion coefficients. Preferably, base portion 102 is made of copper, side wall 104 of stainless steel, and lid 106 of stainless steel. Stainless steel and copper have substantially equal thermal expansion coefficients.

An electrical connector 108 passes through a connector feedthrough 110 in side wall 104. An electrical connector 112 is attached to, and in electrical communication with, side wall 104. An optical fiber 114 passes through a fiber feedthrough 116 in side wall 104. The materials used for feedthroughs 110 and 116 have thermal expansion coefficients similar to the thermal expansion coefficient of side wall 104. Preferably, feedthroughs 110 and 116 are made of stainless steel.

Package 100 is hermetically sealed, in order to prevent deleterious substances such as moisture or organic compounds from coming in contact with optoelectronic components within package 100. For many applications, only metal-to-metal, glass-to-metal, or ceramic-to-metal seals are acceptable. Preferably, package 100 is sealed using only glass-to-metal and metal-to-metal seals. Package 100 is mounted on a receiving structure 120, as shown in a top view in FIG. 3A and a side view in FIG. 3B. Receiving structure 120 is preferably a plate made of a high-thermal-conductivity material such as copper. Receiving structure 120 has a receiving aperture 121 for receiving package 100. Base portion 102 fits into receiving aperture 121. The shape of receiving aperture 121 matches the shape of base portion 102 of package 100.

In a preferred embodiment, base portion 102 is adapted to be pressed into receiving structure 120. It is important that the cross-section of base portion 102 along the interface with receiving structure 120 (see FIG. 3A) have a generally round shape, since sharp corners impede press-fitting. In particular, base portion 102 and receiving aperture 121 have substantially cylindrical, matching shapes. Moreover, the tolerances in the sizes of base portion 102 and receiving aperture 121 are tightly controlled so as to allow press-fitting, as is apparent to the skilled artisan.

It is also important that the materials of structure 120 and base portion 102 be chosen such that the press fit between base portion 102 and structure 120 remains secure during variations in temperature at the interface between structure 120 and base portion 102. Preferably, base portion 102 and structure 120 are made of the same material, or of materials having substantially equal thermal expansion coefficients. Base portion 102 is in thermal communication with receiving structure 120 through an aperture wall 123 of structure 120.

In an alternative embodiment, the fit between the base portion and the receiving structure is a close sliding fit. A thermally conductive adhesive, preferably an epoxy, glues the base portion to the aperture wall of the receiving structure. In yet another embodiment, the base portion is screwed into the receiving structure. More generally, the base portion is secured to the receiving structure by a threaded engagement.

Receiving structure 120 is attached to an external heat sink 124 by screw 126. Heat sink 124 serves as an attachment piece for attaching mount 101 to heat sink 124. Mount 101 comprises base portion 102 and mounting portion 103. The geometry of receiving structure 120 depends on the geometry of heat sink 124. The geometry of base portion 102, however, is largely independent of the geometry of heat sink 124. The use of receiving structures thus allows the use of the same mount 101 with a variety of different external heat sink geometries.

A bottom surface 128 of base portion 102 protrudes slightly from auxiliary plate 120, so as to allow direct contact between base portion 102 and external heat sink 124. Heat flows from base portion 102 into heat sink 124 axially through bottom surface 128, as illustrated by the arrows 130. Heat flows from base portion 102 into receiving structure 120 radially through aperture wall 123, as illustrated by the arrows 131. Allowing direct contact between surface 128 and heat sink 124 provides a significant improvement in the heat flow from base portion 102 to heat sink 124, as compared to a design in which the axial heat flow from base portion 102 would pass through the receiving structure.

Preferably, bottom surface 128 provides for a primary heat flow from base portion 102. That is, more than half of the heat flow from base portion 102 occurs through bottom surface 128. In an alternative embodiment, aperture wall 123 provides for the primary heat flow from base portion 102.

In the embodiment illustrated in FIG. 3A, a casing 122 mechanically protects package 100. In another embodiment (not illustrated), side wall 104 is encased in a polymeric potting material. Electronic components electrically connected to components within package 100 are embedded within the potting material. The use of a potting material provides a convenient way of shaping the outside surface of package 100.

FIGS. 4A and 4B are detailed side and top views, respectively, of package 100. Heat sink mount 101 comprises base portion 102 and a mounting portion 103. Base portion 102 comprises a lower step 132 adapted to be press-fitted into auxiliary plate 120, while mounting portion 103 comprises an upper step 134 enclosed by side wall 104. A piece (ring) 135 of a high electrical and thermal conductivity material (relative to the materials of base portion 102 and side wall 104) is attached to lower step 132 at the interface between mount 102 and side wall 104. Ring 135 provides localized heating to the interface between mount 101 and side wall 104 during a step of welding side wall 104 to mount 101. The relative localization of the temperature increase allows a reduction in the overall heating of package 100, and serves to protect temperature sensitive elements (such as diode lasers) within package 100 from intense heating.

A diode laser 136 is mounted on a block 138, which in turn is attached to upper step 134 by a screw 142. Block 138 is attached tightly to upper step 134, so that the thermal resistance at the interface between block 138 and step 134 is minimized. Block 138 is in thermal communication with base portion 102 and heat sink 124.

Feedthrough 110 comprises an intra-wall portion 160 and a shunting projection 162 extending away from side wall 104. A hermetic, electrically insulating seal 164 is established between connector 108 and shunting projection 162. Shunting projection 162 protects seal 164 from the heat generated by current passing through side wall 104 during the welding of side wall 104 to mount 102 and to lid 106. Seal 164 preferably comprises glass. A glass seal established within side wall 104 would melt during the welding of side wall 104 and lid 106. Connector 108 comprises a flat part 109 to which wires 145 (see FIG. 4B) are attached.

Feedthrough 116 comprises an intra-wall portion 170 and a shunting projection 172 extending away from side wall 104. A hermetic seal 174 is established between optical fiber 114 and shunting projection 172. Shunting projection 172 thermally protects seal 174 during welding steps. Seal 174 preferably comprises a solder.

Laser 136 is optically coupled to an input 180 of fiber 114. Input 180 is preferably shaped to function as a lens, focusing light emitted by laser 136 and coupling the light into fiber 116. Shaping input 180 allows placing input 180 relatively close to laser 136, and eliminates the need for an external lens placed between laser 136 and input 180 of fiber 116. The position of input 180 relative to laser 136 is held fixed by a fiber holder 182. Holder 182 ensures that the optical coupling between laser 136 and fiber 116 is relatively independent of the position of side wall 104. The use of holder 182 allows considerable freedom in the alignment of fiber 116, relative to designs in which the fiber positioning is achieved using a structure directly coupled to the side wall of the package.

Holder 182 is adapted to be press-fitted into a holder aperture 183 in upper step 134. Preferably, holder 182 is substantially thermal-expansion-matched to mount 101, such that fiber 116 and laser 136 move vertically in tandem as the temperature distribution in block 138 and holder 182 varies during the operation of laser 136. A suitable relationship between the thermal expansion coefficients of holder 182 and block 138 can be readily determined empirically for a given geometry of package 100.

FIG. 4C shows a front view of laser 136 and block 138. The bottom surface 144 of laser 136 is in thermal and electrical communication with block 138. In turn, block 138 is in electrical communication with connector 112 through mount 101 and side wall 104 (see FIG. 4A). The top surface 146 of laser 136 is in electrical communication with connector 108 through wires 148, a wire bond plate 150, and wires 145. Wire bond plate 150 is mounted on block 138. The top surface of wire bond plate 150 is electrically insulated from block 138. Block 138 has protrusions 152, 154 for protecting wires 148 from mechanical damage.

FIG. 5A is a detailed top view of part of a block 300 similar to block 138 in FIG. 4A. 5B is a front view of block 300. A laser 302 is mounted on a block 300, and is optically coupled to an optical fiber 304. The position of fiber 304 relative to laser 302 is kept fixed by a holder 314. A cylindrical lens 306 is attached to block 302, and focuses light emitted by laser 300 to an input 308 of fiber 304. Lens 306 is preferably a piece of optical fiber. To make lens 306, the piece of optical fiber is stretched between two holders (not shown), attached to block 300 at attachment points 310, and cleaved to generate the ends 312 of lens 306. Since the holders used for stretching the optical fiber are bulky relative to the size of the package, lens 306 is preferably attached to block 302 before side wall 104 is mounted on mount 101.

Fiber 304 has a bend 316 for taking up a stress resulting from the differential expansion of fiber 304 and side wall 104. A fiber running in a straight line between its holder 182 or 314 and its attachment point to the side wall of 104 of the package would be stretched upon the heating of the package. Bend 316 serves to compensate for the fast expansion of side wall 104 (relative to the expansion of fiber 304), and helps ensure that fiber 304 remains aligned with laser 300 during variations in the temperature of side wall 104.

FIG. 6 shows another embodiment of the present invention. A package 200 comprises a mount 202, a side wall 204, and a lid 206. Mount 202 comprises a lower step 232 and an upper step 234. A light source 236 is mounted directly on upper step 234. The arrangement of FIG. 6 does not require a separate block similar to block 138, and is compact relative to the arrangement shown in FIG. 4A. The absence of a block-mount interface reduces the thermal resistance to heat flow from light source 236. Mount 202 consists of a monolithic piece comprising both the mounting and the base portions of mount 202. Testing and connecting (e.g. burning-in, wire-bond attachment) of light source 236 are performed directly on mount 202 before the welding of side wall 204 to mount 202.

FIG. 7 is a top view of a package 400, according to an alternative embodiment of the present invention. Package 400 contains an optoelectronic chip (not shown) used for signal processing applications. Package 400 has a plurality of electrical connections running through corresponding connection feedthroughs 402, and a plurality of optical fibers running through corresponding fiber feedthroughs 404. It is important that the side wall 406 of package 400 have a cylindrical shape. The radial symmetry facilitates running multiple connections from a common point.

A preferred method of assembling package 100 will now be described in detail with reference to the embodiment as shown in FIGS. 4A to 4C. Laser 136, wire bond plate 150, and wires 148 are assembled on block 138, and laser 136 is burned-in. It is desirable that the burn-in of laser 136 be performed with laser 136 attached to as few parts as possible, so as to minimize the cost of parts in the discarding of defective lasers. In particular, it is desirable that laser 136 not be connected to side wall 104 during its burn in, since side wall 104 has a relatively high cost. Following the burn-in and testing of laser 136, block 138 is attached to upper step 134 using screw 142. Holder 182 is pressed into a suitable hole in the top surface of upper step 134. Fiber 114 is attached to holder 182, and fiber 114 and laser 136 are aligned to allow coupling of light emitted by laser 136 into fiber 114. It is important that side wall 104 not be mounted on mount 101 during the alignment procedures, so as to allow unobstructed access to fiber 114 and laser 136. The ability to attach side wall 104 to base portion 102 after the mounting of laser 136 onto mount 101 allows a significant reduction in the size of package 100, as compared to a package in which testing and alignment is performed within the side wall.

Preferably, before the placement of side wall 104 onto base portion 102, feedthrough 110 is sealed while feedthrough 116 is not sealed. Suitable methods for generating glass-to-metal or ceramic-to-metal seals such as seal 162 are apparent to the skilled artisan. Side wall 104 is placed on base portion 102. Side wall 104 is projection welded to base portion 102, as illustrated in the detailed views of the interface between side wall 104 and mount 101 in FIGS. 8-A and 8-B.

FIG. 8A shows the wall-mount interface prior to welding. A projection 190 of a welding material (e.g. stainless steel) is positioned onto the high electrical and thermal conductivity piece 135. Side wall 104 is positioned onto base portion 102, and a suitable current is run between an electrode contacting the top of side wall 104 and an electrode contacting bottom surface 128. The electrode connected to bottom surface 128 has a large contact area, so as to remove from base portion 102 heat generated during the welding process.

FIG. 8-B shows the wall-mount interface after the completion of the welding step. A layer of welding material 192 generated from projection 190 bonds base portion 102 and side wall 104.

It is important that the significant amount of heat generated during the welding process not damage heat-sensitive structures such as laser 136 and seal 164. The placement of seal 164 within projection 162 outside side wall 104 protects seal 164 from the heat generated within side wall 104. Likewise, high electrical and thermal conductivity piece 135 serves to localize heat production to the wall-mount interface, reducing the heating of laser 136.

Wire bonds 145 are installed for electrically connecting plate 150 to the inside end of connector 108. Fiber 114 is soldered (without flux) to holder 182. Suitable platings or coatings on holder 182 allow soldering without flux. Such platings and coatings are well known in the art. It is desirable that organic substances such as flux not be used in bonding processes proximal to laser 136, since such substances may damage laser 136.

Feedthrough 116 is sealed by fluxless soldering, with heat provided by resistive heating of projection 172. A current is passed within a cross-section of projection 172 while an appropriate solder alloy is inserted into the space between fiber 114 and the inner wall of projection 172. The inner wall of projection 172 and fiber 114 are plated with material suitable for fluxless soldering. Upon solidification, the solder forms seal 174. The material of projection 172 has a thermal expansion coefficient high enough to allow seal 174 to remain hermetic during the solder solidification. Following the sealing of fiber 114 within feedthrough 116, a protective jacket (not shown) for mechanically protecting fiber 114 is slipped over projection 172 and fiber 114. While feedthrough 116 is preferably sealed after the welding of side wall 104 to base portion 102, shunting projection 172 also allows sealing feedthrough 116 before the welding of side wall 104 to base portion 102.

Lid 106 is projection welded to side wall 104 by running a suitable current between electrodes contacting the top of lid 106 and the bottom of mount 102. A high-resistivity ring analogous to ring 135 may be used between lid 106 and side wall 104. Such a ring may not be in general required, however, since the temperature at laser 136 is relatively insensitive to the temperature of lid 106 (as compared to the temperature of mount 102). The electrodes used in the welding step are adapted to remove heat from lid 106 and mount 102.

FIG. 9 illustrates an alternative embodiment of the present invention. A package 500 comprises a mount 502 having a base portion 504 and a mounting portion 506. Base portion 504 is adapted to be pressed into a receiving structure (not shown). A diode laser 508 is mounted on mounting portion 506, and is optically coupled to an optical fiber 510. A connector 512 is in electrical communication with the bottom surface of laser 508 through mount 502. A connector 514 is in electrical communication with the top surface of laser 508 through wires 516 and a wire bond plate (not shown) mounted on mount 502. An electrically insulating piece 518 insulates connector 514 from connector 512. An encapsulation 520 encapsulates and protects laser 508 and fiber 510. Encapsulation 520 comprises a thermally conductive epoxy. A jacket 511 protects fiber 510.

In the embodiment illustrated in FIG. 9, a protective means such as a plate 522 prevents encapsulation 520 from extending into an optical coupling region 524. Region 524 encompasses the space between laser 508 and the input of fiber 510. Encapsulation 520 is made by pouring a high-viscosity epoxy onto mount 502, after the attachment of mount 502 to the receiving structure.

In an alternative embodiment similar to that shown in FIG. 9, the encapsulation extends throughout the coupling region. A protective means is not needed. The encapsulation is transparent at an emission wavelength of the laser used. The encapsulation is made by injecting a transparent epoxy into a mold covering the mount, after the attachment of the mount to the receiving structure.

It will be clear to one skilled in the art that the above embodiment may be altered in many ways without departing from the scope of the invention. For example, various shapes are suitable for the side wall. While it is preferred that the base and mounting portions of the mount are part of a single monolithic piece, separate pieces can also be used. Accordingly, the scope of the invention should be determined by the following claims and their legal equivalents.

What is claimed is:

1. A thermally conductive package comprising:
    a) a heat sink mount comprising a base portion and a mounting portion;
    b) a heat-dissipating semiconductor device mounted on said mounting portion;
    c) a side wall welded to said mount, and enclosing said device;
    d) an electrical connector in electrical communication with said device, said connector passing through a connector feedthrough in said side wall; and
    e) a lid mounted on said side wall opposite said mount, such that a hermetically sealed enclosure is defined substantially by said mount, said side wall, and said lid.

2. The package of claim 1 wherein said device comprises a diode laser.

3. The package of claim 1 wherein said device comprises a light source.

4. The package of claim 3 further comprising an optical fiber in optical communication with said light source.

5. The package of claim 4 wherein said fiber passes through a fiber feedthrough in said side wall.

6. The package of claim 5 wherein said fiber feedthrough comprises:
a) a first shunting projection; and
b) a first seal between said fiber and said first shunting projection.

7. The package of claim 6 wherein:
a) said first seal comprises a solder; and
b) said first shunting projection comprises a metal.

8. The package of claim 4 wherein said fiber has a bend for reducing a stress in said fiber due to a differential thermal expansion of said fiber relative to said side wall.

9. The package of claim 4 further comprising a fiber holder mounted on said mounting portion, for holding an input of said fiber in a fixed position relative to said light source.

10. The package of claim 9 wherein said fiber holder is pressed into a holder aperture in said mounting portion.

11. The package of claim 4 further comprising a lens between said light source and an input of said fiber, for coupling light emitted by said light source into said input.

12. The package of claim 1 wherein said device is in electrical communication with said base portion.

13. The package of claim 1 wherein said base portion is in electrical communication with said side wall.

14. The package of claim 1 wherein said connector feedthrough comprises:
a) a second shunting projection; and
b) a second seal between said connector and said second shunting projection.

15. The package of claim 14 wherein said second seal comprises a glass, and said second shunting projection comprises a metal.

16. The package of claim 1 wherein a cross-section of said side wall has a generally round shape.

17. The package of claim 1 wherein said side wall has a substantially cylindrical shape.

18. The package of claim 1 wherein said side wall and said mount are adapted to be projection welded.

19. The package of claim 18 wherein said lid and said side wall are adapted to be projection welded.

20. The package of claim 1 comprising a high-resistivity piece at an interface between said side wall and said mount, for selectively heating a welding material between said side wall and said mount without substantially heating said light source.

21. The package of claim 1 wherein said base portion comprises a lower step adapted to be mounted on a receiving structure, and said mounting portion comprises an upper step enclosed by said side wall.

22. The package of claim 1 wherein said mounting portion comprises a block mounted on said upper step, said device being mounted on said block.

23. The package of claim 1 wherein said mount comprises copper.

24. The package of claim 1 further comprising a receiving structure having a receiving aperture for receiving said base portion.

25. The package of claim 1 wherein said base portion is a press fit into said receiving structure.

26. A thermally conductive package comprising:
a) a receiving structure having a receiving aperture therein;
b) a heat sink mount having a mounting portion and a base portion, said base portion extending, in part, into and making a pressed engagement within said receiving aperture;
c) a semiconductor laser mounted on said mounting portion; and
d) an optical fiber mounted on said mounting portion and in optical communication with said laser.

27. The package of claim 26 wherein a fit between said base portion and said receiving structure comprises a press fit.

28. The package of claim 26 wherein said base portion is pressed into said receiving aperture.

29. The package of claim 26 wherein a fit between said base portion and said receiving structure comprises a sliding fit.

30. The package of claim 29 further comprising an adhesive at an interface between said base portion and said receiving structure.

31. The package of claim 30 wherein said adhesive is thermally conductive.

32. The package of claim 30 wherein said adhesive comprises an epoxy.

33. The package of claim 26 wherein said receiving structure comprises a high-thermal-conductivity material.

34. The package of claim 26 wherein said a cross-section of said base portion has a generally round shape.

35. The package of claim 26 wherein said base portion has a substantially cylindrical shape.

36. The package of claim 26 wherein a cross-section of said receiving aperture has a generally round shape.

37. The package of claim 26 wherein said receiving aperture has a substantially cylindrical shape.

38. The package of claim 26 wherein said base portion is in thermal communication with said receiving structure through an aperture wall of said receiving structure.

39. The package of claim 38 wherein said aperture wall provides for a primary heat transfer from said base portion.

40. The package of claim 26 wherein a bottom surface of said base portion is in contact with an external heat sink.

41. The package of claim 40 wherein said bottom surface provides for a primary heat transfer from said base portion.

42. The package of claim 26 wherein a bottom surface of said base portion protrudes from said receiving structure.

43. The package of claim 26 further comprising an encapsulation for encapsulating said laser and a part of said optical fiber.

44. The package of claim 43 wherein said encapsulation comprises a thermally conductive epoxy.

45. The package of claim 43 wherein said encapsulation is substantially transparent at an emission wavelength of said laser.

46. The package of claim 43 further comprising protecting means for preventing said encapsulation from extending into an optical coupling region.

47. The package of claim 26 wherein said mount comprises a monolithic piece, said monolithic piece comprising said base portion and said mounting portion.

48. The package of claim 26 further comprising a fiber holder mounted on said mounting portion, for holding an input of said fiber in a fixed position relative to said light source.

49. The package of claim 26 wherein said extending and engaging part of said base portion extends slightly through said receiving aperture for enhancing thermal engagement with an underlying external heat sink.

50. The package of claim 26 further comprising a side wall for enclosure of said heat sink mount, said optical fiber extending through said side wall and mounted in fixed relation therewith, said fiber provided with a bend in a portion thereof extending between said its mounting portion mount and its side wall mount for reducing stress in said fiber due to thermal expansion of said fiber relative to said side wall.

51. A method of fabricating a thermally conductive package comprising the steps of:
   a) establishing a heat sink mount comprising a base portion and a mounting portion;
   b) mounting a heat dissipating semiconductor device on said mounting portion;
   c) welding a side wall to said mount such that said side wall encloses said device, wherein said side wall comprises a sealed connector feedthrough;
   d) establishing an electrical communication between an electrical connector and said device, said connector passing through said connector feedthrough; and
   e) mounting a lid on said side wall, opposite said mount, such that a hermetically sealed enclosure is defined substantially by said mount, said side wall, and said lid.

52. The method of claim 51 wherein said device comprises a light source.

53. The method of claim 52 further comprising the step of establishing an optical communication between an optical fiber and said light source.

54. The method of claim 53 comprising establishing said optical communication before welding said side wall to said mount.

55. The method of claim 53 wherein:
   a) said fiber passes through a fiber feedthrough in said side wall; and
   b) said method comprises the step of establishing a seal between said fiber and a first shunting projection of said fiber feedthrough.

56. The method of claim 54 comprising establishing said seal between said fiber and said first shunting projection after welding said side wall to said mount.

57. The method of claim 51 further comprising the step of establishing a seal between said connector and a second shunting projection of said connector feedthrough.

58. The method of claim 57 comprising establishing said seal between said connector and said second shunting projection before welding said side wall to said mount.

59. The method of claim 51 further comprising testing said device before welding said side wall to said mount.

60. A method of assembling a thermally conductive package comprising the steps of:
   a) providing a heat sink mount having a mounting portion and a base portion,
   b) mounting a semiconductor laser on said mounting portion;
   c) mounting an optical fiber on said mounting portion and establishing an aligned optical communication between said laser and said optical fiber;
   d) providing a receiving structure with a receiving aperture formed therein; and
   e) securing said base portion into said receiving aperture of a receiving structure by pressing a portion of said base portion into said receiving aperture.

61. The method of claim 60 wherein the step of pressing comprises the step of forming a press fit of said base portion into said receiving aperture.

62. A thermally conductive package comprising:
   a) a receiving structure having a receiving aperture therein;
   b) a heat sink mount having a mounting portion and a base portion, said base portion extending, in part, into and making a pressed engagement within said receiving aperture;
   c) a semiconductor laser mounted on said mounting portion;
   d) an optical fiber mounted on said mounting portion and in optical communication with said laser;
   e) an enclosure surrounding said heat sink mount and having a feedthrough for said fiber, said fiber mounted in fixed relation relative to said feedthrough;
   f) said fiber provided with a bend to provide slack in a portion thereof extending between its mounting portion mount and its feedthrough mount for reducing stress on said fiber due to thermal expansion of said fiber relative to said mounts.

* * * * *